United States Patent
Kitayoshi

(10) Patent No.: US 6,314,271 B1
(45) Date of Patent: Nov. 6, 2001

(54) METHOD AND APPARATUS FOR VISUALIZING RADIO WAVE IN CERTAIN AREA

(75) Inventor: Hitoshi Kitayoshi, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/312,749

(22) Filed: May 13, 1999

(30) Foreign Application Priority Data

May 13, 1998 (JP) .................................................. 10-130460

(51) Int. Cl.[7] .................................................. H04B 17/00
(52) U.S. Cl. ........................ 455/67.1; 455/456; 455/67.2; 342/378; 342/451
(58) Field of Search ........................... 455/67.1, 39, 67.6, 455/456, 457, 67.2, 65, 63, 226.1–226.4, 296, 425, 501, 504, 506; 342/378, 179, 451, 452

(56) References Cited

U.S. PATENT DOCUMENTS

| | | | |
|---|---|---|---|
| 5,381,444 | * | 1/1995 | Tajima ........................................ 375/1 |
| 5,455,590 | * | 10/1995 | Collins et al. ........................ 342/179 |
| 5,563,909 | * | 10/1996 | Nakazawa .............................. 375/224 |
| 5,689,812 | * | 11/1997 | Takahashi ............................ 455/67.6 |
| 5,734,347 | * | 3/1998 | McEligot ................................ 342/159 |
| 5,907,578 | * | 5/1999 | Pon et al. .............................. 375/208 |
| 6,070,079 | * | 5/2000 | Kuwahara . | |
| 6,115,614 | * | 9/2000 | Furukawa .............................. 455/525 |

FOREIGN PATENT DOCUMENTS

2034554 * 6/1980 (GB) ................................ G03H/5/00

OTHER PUBLICATIONS

Japanese Patent laid–open Publication No. 65406/1999.
Japanese patent Laid–open Publication No. 153725/1997.
Japanese Patent Laid–Open Publication No. 133721/1997.
Japanese Patent Application No. 317418/1997.

* cited by examiner

Primary Examiner—Thanh Cong Le
Assistant Examiner—Pablo Tran
(74) Attorney, Agent, or Firm—Knobbe Martens Olson & Bear, LLP

(57) ABSTRACT

A method for visualizing radio waves which can only one sensor station to accurately specify the positions of a plurality of radio wave sources operating in the same frequency band and which can monitor a state of utilization of the radio waves. In a sensor station performing a radio wave hologram observation, one or more scanning antennas for scanning along a predetermined path and a plurality of fixed antennas having different directions and positions are provided. A signal received at the scanning antenna interferes with another signal received at the fixed antenna for each fixed antenna while the scanning antenna scans along the predetermined path, thereby obtaining a complex scanning data matrix for which complex weighting and addition processing is performed so that distribution of the radio wave sources is reconstructed.

9 Claims, 2 Drawing Sheets

METHOD AND APPARATUS FOR VISUALIZING RADIO WAVE IN CERTAIN AREA

BACKGROUND OF THE INVENTION

1. Field of the Invention

The present invention relates to a method and an apparatus for performing radio monitoring, and more particularly, to a method and an apparatus for performing radio monitoring in a certain area where radio waves are used at a relatively high density to prevent the generation of radio interference.

2. Description of the Prior Art

With development of a mobile communication system, a wireless local area network (LAN) or the like, radio waves are used at a high density in urban areas and limited frequency resources are shared. Consequently, radio interference is generated to the extent that it can not be negligible.

When a radio wave source which causes the radio interference is specified, a sensor station (monitoring station) is conventionally placed in each of a plurality of points, the Yagi-Uda antenna or a goniometer is used in each sensor station to observe a direction in which a radio wave comes from the radio wave source, and the radio wave incoming directions at respective sensor stations are plotted on a map to specify the position of the radio wave source based on the position of an intersection point of the directions.

Since the above-mentioned conventional method specifies the position of the radio wave source based on the intersection point of the incoming directions of the radio wave observed in the sensor stations, at least two sensor stations are required. Thus, this method has a disadvantage that it can specify only a radio wave source of a relatively strong radiation receivable simultaneously at two or more sensor stations. Additionally, when two or more radio wave sources are present at positions near to each other at the same frequency band, radio waves transmitted therefrom can not separated for observation, thereby obtaining a result of observing the incoming radio wave direction in the sensor station in the form of a synthesized radio wave. Thus, it may be impossible to estimate each position of the radio wave source in this case.

The radio interference in urban areas may frequently occur even between radio wave sources which are close to each other and emit relatively weak radio waves. Also, the sensor stations can not be placed at a high density in consideration of costs or the like. Consequently, according to the conventional method, it is impossible to completely specify the generation source of the radio interference and it is extremely difficult to find the cause of the radio interference.

SUMMARY OF THE INVENTION

The object of the present invention is to provide a method for visualizing radio waves in a certain area which can use only one sensor station to specify the positions of a plurality of radio wave sources operating in the same frequency band and which can monitor a state of utilization of radio waves.

Another object of the present invention is to provide an apparatus for visualizing radio waves in a certain area which can use only one sensor station to specify the positions of a plurality of radio wave sources operating in the same frequency band and which can monitor a state of utilization of radio waves.

The first object of the present invention is achieved by a method for visualizing radio waves in a specific area for observing radio waves from radio wave sources to reconstruct a radio wave hologram to visualize distribution of the radio wave sources, the method comprising the steps of: providing one or more scanning antennas and a plurality of fixed antennas having different directions and/or positions in a sensor station; causing a signal received at the scanning antenna to interfere with a signal received at the fixed antenna for each of the fixed antennas to thereby obtain a complex scanning data matrix while the scanning antenna scans along a predetermined path; performing complex weighting addition processing for the complex scanning data matrix to reconstruct distribution of the radio wave sources.

The second object of the present invention is achieved by an apparatus for visualizing radio waves in a specific area for observing radio waves from radio wave sources to reconstruct a radio wave hologram to visualize distribution of the radio wave sources, the apparatus comprising: one or more scanning antennas for scanning along a predetermined path; a plurality of fixed antennas having different directions and/or positions; an interference unit for causing a signal received at each of the scanning antennas to interfere with a signal received at each of the fixed antennas to output an interference signal; a detector for complex detecting the interference signal to obtain a detection output; and operation means for temporally storing as a complex scanning data matrix the detection output for each combination of one of the scanning antennas and one of the fixed antennas and performing complex weighting addition processing for the complex scanning data matrix to reconstruct distribution of the radio wave sources.

According to the present invention, by employing the above-mentioned configuration, one sensor station can be used to separate radio wave sources extremely close to one another for observation, and plane distribution (two-dimensional distribution) and characteristic distribution of radio wave sources can be accurately obtained even in an area where radio waves are used at a high density.

The above and other objects, features, and advantages of the present invention will be apparent from the following description referring to the accompanying drawing which illustrate an example of a preferred embodiment of the present invention.

DESCRIPTION OF THE PREFERRED EMBODIMENT

Figure 1:
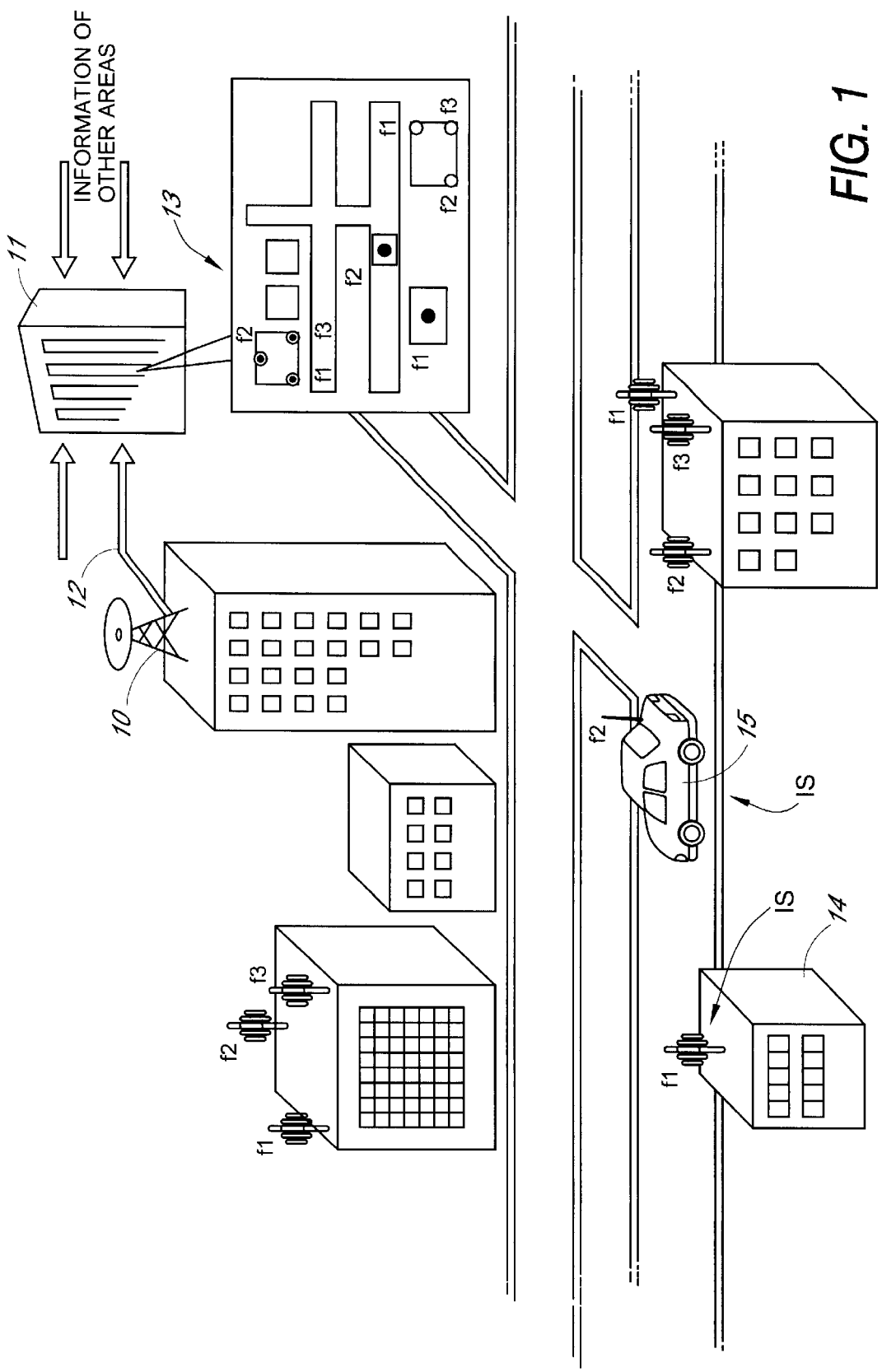
FIG. 1 is a view for explaining a concept of radio wave visualization in an area according to the present invention.

A general outlines of radio wave visualization in a certain area based on the present invention will be described with reference to FIG. 1. Shown in FIG. 1 is a typical urban area, in which references f1 to f3 represent transmission antennas of radio stations operating at frequencies f1 to f3, respectively. Assume that a radio station operating at frequency f1 provided at a rooftop of building 14 and a radio station operating at frequency f2 provided at car 15 running on a street are interference radio stations IS which cause radio interference.

For radio monitoring in a surveillance area, sensor station 10 is placed at a position which offers a broad view of the surveillance area, for example at the rooftop of a high-rise building. Sensor station 10 performs a radio wave hologram observation to thereby obtain information on the positions of respective radio wave sources in the surveillance area. Sensor station 10 is connected to center station 11 through line 12. Center station 11 also collects information from other areas to produce and output radio wave utilization monitoring diagram 13 which displays a state of utilization of radio waves in real time.

Next, a configuration of an apparatus for visualizing radio waves used in the radio wave hologram observation in sensor station 10 will be described with reference to FIG. 2.

Since a radio wave is a kind of wave motions, a radio wave hologram can be observed similarly as in the case of a light hologram. The radio wave hologram is reconstructed to thereby obtain a radio wave reconstructed image, from which the distribution and intensity of wave sources can be investigated. The radio wave reconstructed image from the radio wave hologram observation may be obtained by, for example, providing a fixed antenna and a scanning antenna which successively moves in a scanning observation plane, correlating a received signal at the fixed antenna with another received signal at the scanning antenna at a predetermined observation frequency to derive a complex correlation value at each point in the scanning observation plane. The two-dimensional arrangement of the complex correlation values is a two dimensional complex interferogram. Then, the radio wave reconstructed image is obtained by reconstructing the two-dimensional complex interferogram.

Since sensor station 10 is placed at the rooftop of a high-rise building or the like as described above, it is desirable that the radio wave hologram observation can be performed in all directions (360°) in a horizontal plane. Thus, a circular scanning type hologram observation apparatus disclosed in Japanese Patent Laid-open Publication No. 65406/1999 (JP, 11065406, A) by the present inventor can be used as an apparatus for performing the radio wave hologram observation. However, a conventional radio wave hologram observation apparatus using a pair of a fixed antenna and a scanning antenna has a limited resolution of a reconstructed image due to a limitation on the observation plane or the like. When a plurality of radio wave sources are placed extremely close to one another, a complicated calculation is required to separate them.

Thus, in this embodiment, in a circular scanning type hologram observation apparatus, a plurality of fixed antennas having different directions and positions are provided and these fixed antennas are alternatively switched for use. Also, for the scanning antenna, a plurality of antennas are provided as required to be alternatively switched for use. In later operation, a weighting coefficient is manipulated in weighting process, thereby making it possible to separate a plurality of radio wave sources for observation.

Figure 2:
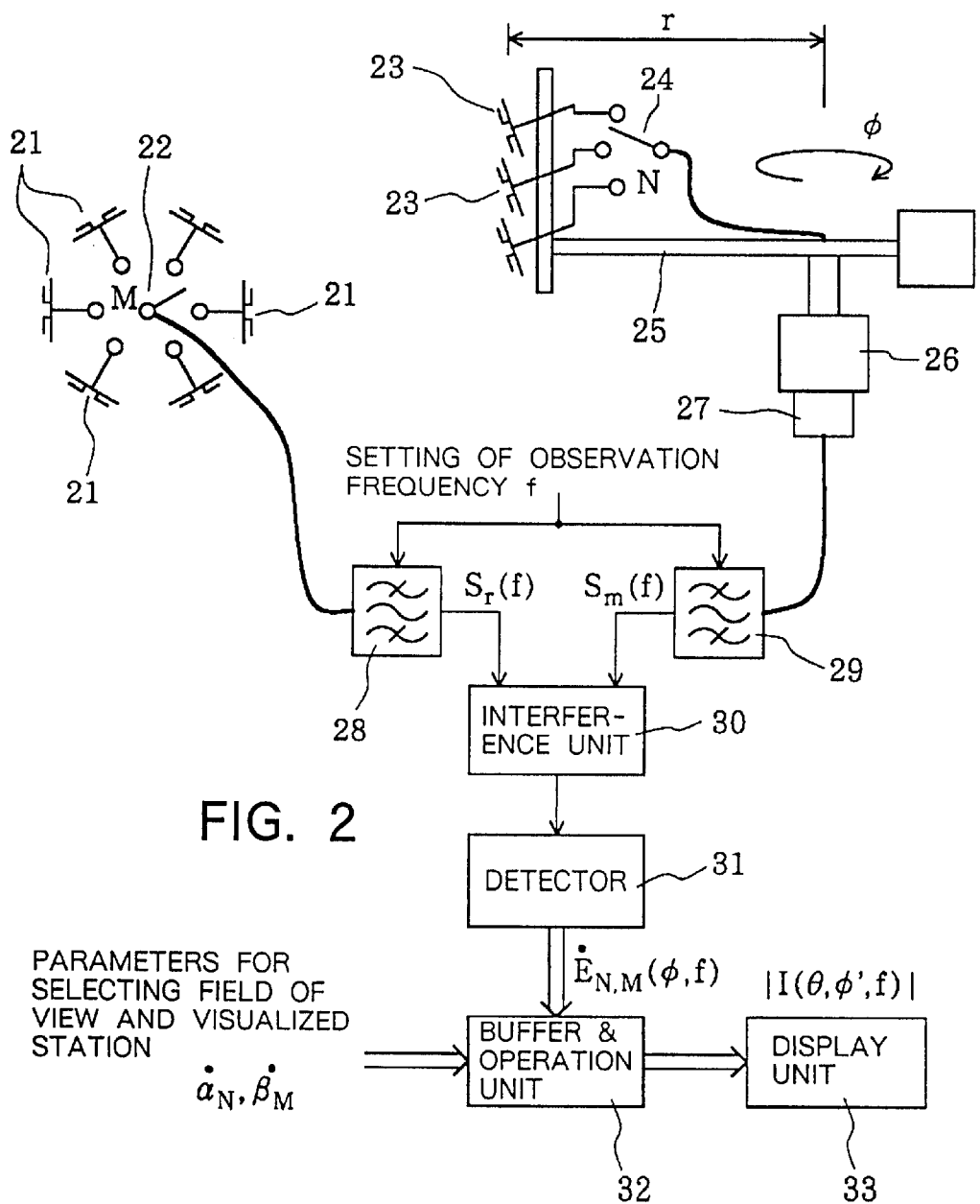
FIG. 2 is a block diagram showing a configuration of an apparatus for visualizing radio waves in a preferred embodiment of the present invention.
Figure 3:
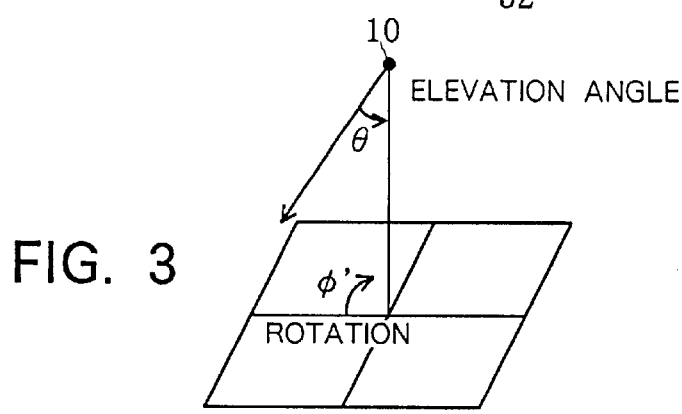
FIG. 3 is a diagram for explaining angles $\theta$ and $\phi'$.

In an apparatus shown in FIG. 2, a plurality of fixed antennas 21 having different directions and positions are provided such that a received signal of one of these fixed antennas 21 is taken by switch 22. Variable M is used to indicate to which of fixed antennas 21 switch 22 is connected. A plurality of scanning antennas 23 are attached to an end portion of beam member 25 which rotates in a horizontal plane by means of motor 26. Scanning antennas 23 are arranged in a vertical direction such that respective scanning antennas 23 have scanning planes (i.e., revolution plane) with different heights. The angle between the direction center axis and the horizontal plane may vary among scanning antennas 23. Switch 24 is attached to beam member 25 such that one of scanning antennas 23 can be selected by switch 24. Variable N is used to indicate to which of scanning antennas 23 switch 24 is connected. A received signal of one of scanning antennas 23, selected by switch 24, is taken through rotary joint 27. Incidentally, it is assumed that the radius of revolution of scanning antenna 23 is r, the rotation angle of scanning antenna 23 is ø, and the observation frequency is f. Additionally, elevation angle θ and position angle ø' for a radio wave source viewed from sensor station 10 are defined as shown in FIG. 3. The arrow mark in FIG. 3 indicates the direction for the radio wave source. For each of fixed antennas 21 and scanning antennas 23, a probe antenna shown in Japanese Patent Laid-open Publication 153725/1997 (JP, 09153725, A) by the present inventor can be preferably used, for example.

A received signal of fixed antenna 21 selected by switch 22 is applied to band-pass filter 28 to be limited to a predetermined observation frequency band, and then outputted as signal $S_r(f)$. Similarly, a received signal of scanning antenna 23 selected by switch 24 is applied to band-pass filter 29 to be limited to the predetermined observation frequency band, and then outputted as signal $S_m(f)$. The pass band, that is, the observation frequency band, in band-pass filters 28 and 29 can be set from the outside as "setting of observation frequency f".

Interference unit 30 is provided for causing signals $S_r(f)$, $S_m(f)$ from respective band-pass filters 28 and 29 to interfere with each other to obtain interference signal $\int S_r^*(f) S_m(f) dt$, and detector 31 is provided for complex detection of the output signal from interference unit 30, where t represents a time variable and * represents a complex conjugate. For interference unit 30 and detector 31, a device, in which a multiplier and a vector detector are combined, disclosed as a correlation function measurement device in Japanese Patent Laid-open Publication 133721/1997 (JP, 09133721, A) by the present inventor can be preferably used.

In this embodiment, the radio wave hologram observation is performed with the plurality of fixed antennas 21 being switched by switch 22 and with the plurality of scanning antennas 23 being switched by switch 24. Thus, the output signal from detector 31 is a complex scanning data matrix $\dot{E}_{N,M}(\phi, f)$ whose rows and columns depend on which antennas are selected by switches 22 and 24, respectively.

Buffer and operation unit 32 for performing a numerical operation for the complex scanning data matrix is provided on the output side of detector 31. Specifically, buffer and operation unit 32 performs the operation for separating radio wave sources extremely close to each other. The detailed procedure thereof is described in Japanese Patent Application No. 317418/1997 ("Multidimensional hologram data processing apparatus and method for extracting a plurality of peak points for multidimensional hologram data and an area occupied thereby using the same") by the present inventor. In the following, the procedure will be described in brief. In the following description, a radio wave source to be visualized is also referred to as a visualized station.

Buffer and operation unit 32 receives parameters $\dot{\alpha}_N, \dot{\beta}_M$ for selecting a field of view and a visualized station in addition to the output from detector 31. Buffer and operation unit 32 temporally accumulates the output from detector 31 and performs the operation represented by:

$$\dot{I}(\theta, \phi', f) = \sum_N \dot{\alpha}_N \sum_M \dot{\beta}_M \int_{-\pi/2}^{\pi/2} W(\phi) e^{-j2\pi r \sin\theta \cos\phi/\lambda} \dot{E}_{N,M}(\phi + \phi', f) d\phi \quad (1)$$

where λ represents a wavelength of a radio wave (λ=c/f where c is speed of light), and as parameters $\dot{\alpha}_N, \dot{\beta}_M$, and weighting function W(ø), the following are used:

$$\dot{\alpha}_N = e^{jKN}$$

$$\dot{\beta}_M = e^{jR\cos(LM)}$$

$$W(\phi) = \frac{1}{\pi}(1 + \cos(2\phi))$$

where K represents a parameter for a field of view, R and L represent parameters for selecting a visualized station. It goes without saying that parameters and a weighting function other than those as shown above may be used for selecting the field of view and the visualized station.

Consequently, buffer and operation unit 32 temporally stores the output from detector 31 as the complex scanning data matrix and performs processing of complex weighting and addition for this complex scanning data matrix $\dot{E}_{N,M}(\phi,f)$, thereby reconstructing the plane and characteristic distribution of radio wave source. In the complex weighting and adding processing, a weighting coefficient for each fixed antenna is used for separating different radio wave sources in the same frequency band. A weighting coefficient for each reception point, i.e. each scanning position of the scanning antenna is used for separating the direction and the elevation angle of the radio wave source. Since the circular scanning is employed in this embodiment, the scanning position is represented by rotation angle ø. Additionally, the weighting coefficient for each scanning antenna is used for adjusting the field of view in the direction and/or elevation angle of the radio wave source to be visualized. The use of some of the respective weighting coefficients can be omitted.

Buffer and operation unit 32 calculates complex intensity distribution $\dot{I}(\theta,\phi',f)$ in accordance with equation (1) and the complex intensity distribution is applied to display unit 33. Display unit 33 calculates absolute value $[\dot{I}(\theta,\phi',f)]$ to display the reconstructed result of the plane and characteristic distribution of the radio wave sources.

As described above, in accordance with this embodiment, the plane and characteristic distribution of the radio wave sources can be reconstructed and displayed to obtain radio wave utilization monitoring diagram 13.

Although a preferred embodiment of the present invention has been described, the present invention is not limited to the above-mentioned aspect.

The radio wave hologram observation is not limited to the circular scanning type, and linear scanning or scanning on an arbitrary curved surface may be used, for example. Also, instead of using a plurality of fixed antennas, one fixed antenna may be used to change the direction and position thereof, thereby performing a plurality of observations. Additionally, for the scanning antenna, one scanning antenna may be used to perform a plurality of observations with varying height of the antenna scanning plane rather than arranging a plurality of scanning antennas in a height direction.

Instead of using a switch for switching a plurality of fixed antennas, a plurality of band-pass filters, interference devices, and detectors may be provided to simultaneously observe a plurality of holograms. Similarly, instead of using a switch for switching a plurality of scanning antennas, a plurality of band-pass filters, interference devices, and detectors may be provided to simultaneously observe a plurality of holograms.

It is to be understood that variations and modifications of the method and apparatus for visualizing radio waves disclosed herein will be evident to those skilled in the art. It is intended that all such modifications and variations be included within the scope of the appended claims.

What is claimed is:

1. A method for visualizing radio waves in an area for observing radio waves from radio wave sources to reconstruct a radio wave hologram to visualize distribution of the radio wave sources, said method comprising:

disposing one or more scanning antennas and a plurality of fixed antennas having different directions and/or positions in a sensor station;

causing a signal received at the scanning antenna to interfere with another signal received at the fixed antenna for each of the fixed antennas to thereby obtain a complex scanning data matrix while the scanning antenna scans along a predetermined path; and performing complex weighting and addition processing for the complex scanning data matrix to reconstruct distribution of the radio wave sources.

2. The method for visualizing radio waves according to claim 1, wherein a weighting co efficient for each of the fixed antennas is used in the complex weighting and addition processing for separating different radio wave sources in the same frequency band.

3. The method for visualizing radio waves according to claim 1, wherein a weighting coefficient for each of scanning positions of the scanning antenna is used in the complex weighting and addition processing for separating a direction and an elevation angle of the radio wave source viewed from the sensor station.

4. The method for visualizing radio waves according to claim 1, wherein a plurality of scanning antennas are used and a weighting coefficient for each of the scanning antenna is used in the complex weighting and addition processing for adjusting a field of view in a direction and/or an elevation angle of the radio wave source viewed from the sensor station.

5. The method for visualizing radio waves according to claim 1, wherein the predetermined path is a circle, a plurality of scanning antennas revolving along the circle without changing mutual positional relationship are used, the complex scanning data matrix is defined using as $\dot{E}_{N,M}(\phi,f)$ a result of interference between a signal received at N-th scanning antenna and a signal received at M-th fixed antenna when a revolution angle of the scanning antenna is ø and an observation frequency is f, and the distribution of the radio wave sources is reconstructed by operating the following as the complex weighting and addition processing:

$$\dot{I}(\theta, \phi', f) = \sum_N \dot{\alpha}_N \sum_M \dot{\beta}_M \int_{-\pi/2}^{\pi/2} W(\phi) e^{-j2\pi r \sin\theta \cos\phi/\lambda} \dot{E}_{N,M}(\phi + \phi', f) d\phi$$

where a predetermined weighting function is W(ø), a ratio of a circumference of a circle to its diameter is π, imaginary unit is j, a radius of the circle is r, a wavelength of the observed radio wave is λ, parameters for selecting a field of view and a radio wave source to be visualized are $\dot{\alpha}_N, \dot{\beta}_M$, and a position angle and an elevation angle of the radio wave source to be observed are ø', θ, respectively.

6. An apparatus for visualizing radio waves in an area for observing radio waves from radio wave sources to reconstruct a radio wave hologram to visualize distribution of the radio wave sources, said apparatus comprising:

one or more scanning antennas for scanning along a predetermined path;

a plurality of fixed antennas having different directions and/or positions;

an interference unit for causing a signal received at each of said scanning antennas to interfere with a signal received at each of said fixed antennas to output an interference signal;

a detector for complex detection of the interference signal to obtain a detection output; and an operation unit temporally storing as a complex scanning data matrix the detection output for each combination of one of said scanning antennas and one of said fixed antennas and performing complex weighting and addition processing for the complex scanning data matrix to reconstruct distribution of the radio wave sources.

7. The apparatus for visualizing radio waves according to claim 6, wherein the predetermined path is a circle.

8. An apparatus for visualizing radio waves in an area for observing radio waves from radio wave sources to reconstruct a radio wave hologram to visualize distribution of the radio wave sources, said apparatus comprising:

a plurality of fixed antennas having different directions and/or positions;

a first switch for selecting one of said fixed antennas;

a plurality of scanning antennas for scanning along a predetermined path;

a second switch for selecting one of said scanning antennas;

an interference unit for causing a signal received at one of said fixed antennas selected by said first switch to interfere with a signal received at one of said scanning antennas selected by said second switch to output an interference signal;

a detector for complex detection of the interference signal to obtain a detection output; and an operation unit temporally storing as a complex scanning data matrix the detection output for each combination of a position of said first switch and a position of said second switch and performing complex weighting and addition processing for the complex scanning data matrix to reconstruct distribution of the radio wave sources.

9. The apparatus for visualizing radio waves according to claim 8, wherein the predetermined path is a circle.

* * * * *